United States Patent Office 3,303,148
Patented Feb. 7, 1967

3,303,148
HIGH-DENSITY POLYPROPYLENE BLEND WITH A CELLULOSE ETHER OR ESTER
Frederick B. Joyner and Harry W. Coover, Jr., Kingsport, Tenn., assignors to Eastman Kodak Company, Rochester, N.Y., a corporation of New Jersey
No Drawing. Original application Mar. 28, 1960, Ser. No. 17,776. Divided and this application July 15, 1965, Ser. No. 484,148
7 Claims. (Cl. 260—17)

This application is a division of our U.S. application, Serial No. 17,776, filed March 28, 1960 now abandoned, entitled "Modified High-Density Polypropylene With Improved Impact Strength."

This invention relates to polypropylene compositions having improved properties. More particularly, it concerns novel blends comprising high-density polypropylene and other polymeric materials. In a specific aspect, this invention concerns high-density polypropylene compositions particularly characterized by unusually high impact strength.

It is known that the physical properties of high-density polypropylene are generally superior to those of high-density polyethylene and many similar polymeric materials. However, crystalline polypropylene has an extremely serious drawback in that it generally has a low impact strength. Accordingly, it is desirable to improve this important property in order to increase the value and versatility of polypropylene as a plastic.

It is accordingly an object of this invention to provide new and improved polypropylene compositions exhibiting greater impact strength than polypropylene.

Another object of this invention is to provide a method for improving the impact strength of high-density polypropylene.

Another object of this invention is to provide substantially high-density polypropylene structures having improved impact resistance without materially downgrading the other physical properties of the polypropylene.

Still another object of this invention is to provide extended and/or plasticized high-density polypropylene structures affording a complete spectrum of useful properties.

Further objects and advantages of the invention will be apparent to those skilled in the art from the accompanying disclosure and claims.

In accordance with this invention, it has been found that high-density polypropylene exhibits an unusual degree of compatibility with a wide variety of chemically and physically dissimilar polymeric materials, which compatibility can be utilized to modify high-density polypropylene to give materials having improved impact resistance. Hence, polymeric blends of high-density polypropylene containing about 2 to about 50% and more preferably about 5 to about 30% by weight, based on the blend, of one or more of the polymeric modifiers, as hereinafter described, have been found to exhibit improved impact strength over conventional high-density polypropylene.

The unusual compatibility of high-density polypropylene with materials of substantially unrelated and widely varying molecular structures is quite unexpected in view of the incompatibility of crystalline polyethylene with these same materials. Thus, when the modifiers of this invention are incorporated into high-density or into conventional polyethylene, they are found to be substantially incompatible.

The unusual compatibility of high-density polypropylene with chemically dissimilar polymeric materials was even more surprising since this polymer shows little or no compatibility with amorphous or rubbery polypropylene.

It is readily apparent that the compositions of our invention, which are characterized by Izod impact strengths usually in excess of 3 ft. lbs. per inch of notch at 23° C., greatly increase the value of polypropylene as a plastic since conventional high-density polypropylene generally exhibits an impact strength of only about 1 ft. lb. per inch of notch at 23° C.

The truly generic scope of this invention is readily apparent from an inspection of the broad classes of substantially unrelated and widely varying types of polymeric modifiers which may be employed in practicing it. Hence, effective modifiers include: (1) polymers of unsaturated polymerizable compounds containing at least one terminal methylene group, (2) polyether glycols having the structure:

$$HO-R-(-O-R-)_n-OR'$$

wherein R is an alkylene radical of from 2 to 4 carbon atoms, R' is hydrogen, an alkyl, cycloalkyl or aryl radical and $n$ is an integer which will give a polymer having a molecular weight of at least 1000, (3) cellulose esters of carboxylic acids, and (4) cellulose ethers.

The polymers of unsaturated polymerizable compounds containing at least one terminal methylene group which are operable in the practice of this invention includes (1) polystyrene and copolymers of styrene with alkyl fumarates, vinyl esters and acrylonitriles, as exemplified by 70/30 copolymer styrene/acrylonitrile,
70/30 copolymer styrene/fumaronitrile,
97/3 copolymer styrene/maleonitrile,
50/50 copolymer styrene/methacrylonitrile,
50/50 copolymer styrene/dimethyl fumarate,
90/10 copolymer styrene/methyl acrylate,
75/25 copolymer styrene/α-methylstyrene,
95/5 copolymer styrene/2-vinylpyridine,
80/20 copolymer styrene/N-isopropyl acrylamide and 50/25/25 copolymer styrene/acrylonitrile/vinylcarbzole, and (2) homo- and copolymers of vinyl esters having the structure:

$$CH_2=C-OOC-R$$
$$\phantom{CH_2=C-OOC}|$$
$$\phantom{CH_2=C-OOC}R'$$

wherein R is an alkyl, cycloalkyl or aryl radical desirably containing 1 to 16 carbon atoms and R' is either hydrogen or methyl, as exemplified by 50/50 copolymer vinyl acetate/maleic anhydride,
50/50 copolymer vinyl acetate/diethyl fumarate,
50/50 copolymer vinyl acetate/diethyl maleate,
50/50 copolymer isopropenyl acetate/vinyl chloride,
50/50 copolymer isopropenyl acetate/dimethyl fumarate,
90/10 copolymer vinyl acetate/vinyl oleate,
85/15 copolymer vinyl acetate/vinyl benzoate,
50/50 copolymer vinyl acetate/ethylene,
80/20 copolymer vinyl acetate/ethylene and 38/62 copolymer vinyl acetate/acrylonitrile, and (3) homo- and copolymers of 1,3-butadiene and its derivatives having the structure:

$$CH_2=C-C=CH_2$$
$$\phantom{CH_2=}|\phantom{-C=}|$$
$$\phantom{CH_2=}R\phantom{-C=}R'$$

wherein R or R' is hydrogen or methyl and copolymers of these monomers with styrene, acrylonitrile, methacrylonitrile and vinyl esters, as exemplified by poly(1,3-butadiene), polyisoprene,
46/54 copolymer 1,3-butadiene/styrene,
70/30 copolymer 1,3-butadiene/styrene,
79/21 copolymer 1,3-butadiene/styrene, 15/85 copolymer 1,3-butadiene/styrene,
75/25 copolymer isoprene/styrene,
25/75 copolymer isoprene/styrene,
74/26 copolymer 1,3-butadiene/acrylonitrile,
64/36 copolymer 1,3-butadiene/acrylonitrile,
82/18 copolymer 1,3-butadiene/acrylonitrile,
20/80 copolymer 1,3-butadiene/acrylonitrile,
78/22 copolymer 1,3-butadiene/methacrylonitrile,
75/25 copolymer 1,3-butadiene/methyl vinyl ketone,
80/20 copolymer 1,3-butadiene/2,3-dimethyl-1,3-butadiene,
80/20 copolymer chloroprene/acrylonitrile and 80/20 copolymer chloroprene/styrene, and (4) homo- and copolymers of vinyl and vinylidene halides, as exemplified by poly(vinyl chloride), poly(vinylidene chloride),
90/10 copolymer vinylidene chloride/vinyl chloride,
85/13/2 copolymer vinylidene chloride/vinyl chloride/acrylonitrile,
87/13 copolymer vinyl chloride/vinyl acetate,
62/38 copolymer vinyl chloride/vinyl acetate,
95/5 copolymer vinyl chloride/vinyl acetate,
80/20 copolymer vinyl chloride/vinylidene chloride,
80/20 copolymer vinyl chloride/dimethyl maleate,
80/20 copolymer vinyl chloride/methyl acrylate,
80/10/10 copolymer vinyl chloride/dimethyl maleate/diethyl maleate,
87/13 copolymer vinyl chloride/methyl acrylate,
90/10 copolymer vinyl chloride/methyl methacrylate,
60/40 copolymer vinyl chloride/acrylonitrile,
71/29 copolymer vinyl chloride/vinyl isobutyl ether,
65/35 copolymer vinylidene chloride/acrylonitrile,
80/20 copolymer vinylidene chloride/vinyl acetate, and
97/3 copolymer vinylidene chloride/isobutylene.

Operative polyether glycols having the structure:

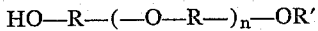

wherein R is an alkylene radical of from 2 to 4 carbon atoms, R' is hydrogen, alkyl, cycloalkyl or aryl radical and $n$ is an integer which will give a polymer having a molecular weight of at least 1000, include:

polyethylene glycol, polypropylene glycol,
90/10 copolymer ethylene glycol/propylene glycol,
10/90 copolymer ethylene glycol/propylene glycol,
50/50 copolymer ethylene glycol/propylene glycol,
50/50 copolymer ethylene glycol/$\alpha$-butylene glycol, and
poly(tetramethylene glycol).

Some specific carboxylic acid esters of cellulose which may be employed as modifiers for polypropylene in accordance with this invention include cellulose acetate (36–42% acetyl), cellulose acetate propionate (13–15% acetyl; 30–34% propionyl), cellulose acetate butyrate (12–15% acetyl; 30–38% butyryl), cellulose acetate isobutyrate (13–15% acetyl; 30–38% isobutyryl), cellulose formate (20–30% formyl), cellulose tributyrate, cellulose trilaurate and cellulose dibenzoate.

Cellulose ethers which may be used to improve the impact strength of high-density polypropylene include, for example, methyl cellulose (D.S.=2.6 to 2.8), ethyl cellulose (D.S.=2.0–2.6), propyl cellulose (D.S.=1.5–2.0), butyl cellulose (D.S.=1.8–2.0) and benzyl cellulose (D.S.=2.2).

In the practice of this invention, it is preferred to employ from about 5 to about 30% of the polymeric modifier and from about 70 to about 95% of the high-density polypropylene in making the blend. However, intermediate concentrations are operable, but they are generally less satisfactory. In general concentrations of about 2 to about 50% of the modifier can be used.

Any propylene polymer characterized by a conditioned density of at least 0.90 and, more preferably, having a conditioned density in the range of about 0.91 to about 0.92 g./cc. and a molecular weight of at least 20,000 and more preferably 40,000 to 200,000 can be used in the practice of this invention. The method by which the polypropylene is formed appears to be wholly immaterial, provided the polymer has a density of at least 0.90 and a molecular weight of at least 20,000 as previously stated. The molecular weight of such a polymer can best be determined by measuring its inherent viscosity, which, for purposes of this invention, should be in the range of about 0.8 to 3.5 as determined in tetralin at 145° C.

Blends of crystalline polypropylene with one or more of the polymeric modifiers described herein can be prepared in any desired manner whether it be mechanical mixing, coprecipitation or other blending method. Thus, they can be prepared at elevated temperatures on rolls, in a Banbury mixer or any other suitable type of processing equipment. The polymeric modifiers can have molecular weights of 1000 and higher depending on the particular blend properties desired and the blending method employed. It is to be understood, of course, that any of the specified polymeric modifiers having a molecular weight in excess of 1000, which are capable of increasing the impact strength of high-density polypropylene, are within the scope of the invention.

The invention is illustrated by the following examples of certain preferred embodiments thereof, although it will be understood that these examples are merely illustrative and are not intended to limit the scope of the invention unless otherwise specifically indicated.

*Example 1*

A blend of 9 parts, by weight, of high-density polypropylene (inherent viscosity=2.2 in tetralin at 145° C. and density=0.917 g./cc.) with 1 part, by weight, of polystyrene was prepared by milling the two polymeric materials together on the hot rolls of a rubber mill. The resulting blend had an Izod impact strength of 0.97 ft. lb. per inch of notch (hinge break) at 23° C.

By comparison, the same polypropylene alone, gave an Izod impact strength of only 0.41 ft. lb. per inch of notch and polystyrene alone gave only an Izod impact strength of 0.6 ft. lb. inch of notch.

Similar improvements in the impact strength of the polypropylene are obtained by substituting 50/50 copolymer styrene/bis(2,2-dimethylpentyl) fumarate, 75/25 copolymer styrene/vinyl acetate or 80/20 copolymer styrene/acrylonitrile for the polystyrene, as above.

*Example 2*

A blend of 19 parts, by weight, of polypropylene having a density of 0.910 g./cc. and one part, by weight, of polyvinyl acetate was prepared by milling the two materials together on the hot rolls of a rubber mill. The resulting blend had an Izod impact strength of 0.97 ft. lb. per inch of notch at 23° C. and a tensile impact strength at 23° C. of 42 ft. lb. per cubic inch as compared with values for the unmodified polypropylene of 0.67 and 28 respectively.

A similar increase in impact strength is obtained when the polyvinyl acetate is replaced by polyvinyl isobutyrate, 50/50 copolymer vinyl isobutyrate/di(2-ethylhexyl) fumarate, 50/50 copolymer vinyl stearate/bis(2,2-dimethylpentyl) fumarate, or 85/15 copolymer vinyl acetate/vinyl benzoate.

*Example 3*

Polypropylene having an inherent viscosity of 2.54 in tetralin at 145° C. and a density of 0.906 g./cc. was blended on hot rolls with each of the polymers listed below. Physical properties data, as set forth below, shows that the tensile properties of the polypropylene were not seriously impaired by blending, whereas, the impact strength was greatly improved in each case.

| Modifier | Conc. In Blend, Percent | Izod Impact Strength [a] | Tensile Strength, psi.[b] | | Elongation [b] At Break, Percent |
|---|---|---|---|---|---|
| | | | At Break | At Yield | |
| None | | 1.33 | 2,735 | 4,980 | 60 |
| Polyisoprene | 30 | [c] 6.84 | 3,180 | 2,555 | 505 |
| Copolymer Butadiene/Styrene [d] | 10 | [c] 4.29 | 2,965 | 4,340 | 35 |
| Copolymer Butadiene/Acrylonitrile [e] | 15 | [c] 5.31 | 3,010 | 4,050 | 20 |

[a] ASTM D256–54T at 23° C., ft.-lb. per inch of notch.
[b] ASTM D412–51T.
[c] Incomplete break.
[d] Plioflex 1778 (Goodyear).
[e] Butaprene NF (Firestone).

*Example 4*

Cellulose acetate having an average of 2.6 acetyl groups per glucose unit was blended with 8.5 parts of high-density polypropylene (inherent viscosity=3.02 in tetralin at 145° C.; density=0.914 g./cc.) on hot rolls. The resulting blend had an Izod impact strength at 23° C. of 3.98 ft. lb. per inch of notch (ASTM D256–54T) compared with a value of 1.26 for the unmodified polypropylene.

Similar improvements in impact strength were obtained by blending the polypropylene with cellulose acetate butyrate, with methyl cellulose, or with ethyl cellulose.

*Example 5*

A blend comprising one part of polyvinyl chloride and 9 parts of high-density polypropylene (inherent viscosity=2.2 in tetralin at 145° C.; density=0.917 g./cc.) was prepared by milling the polymers together on hot rolls. Prior to blending, the polyvinyl chloride (100 parts) was stabilized by the addition of 3 parts of Staflex OY, 2 parts of resorcinol bisglycidyl ether, and 2 parts of dibutyltin dilaurate. The Izod impact strength of the blend was 65 percent greater than that of the original polypropylene.

Similar improvements in the impact strength of the polypropylene are obtained by substituting 62/38 copolymer vinyl chloride/vinyl acetate, 88/12 copolymer vinyl chloride/vinylidene chloride, 80/20 copolymer vinyl chloride/methyl acrylate, 80/20 copolymer vinyl chloride/dimethyl maleate, or 80/20 copolymer vinyl chloride/acrylonitrile for the polyvinyl chloride, as above.

Thus, by the practice of this invention, a substantially high-density polypropylene composition having improved impact resistance over conventional high-density polypropylene which composition substantially maintains the other physical properties of polypropylene is provided. These compositions can be used as substitutes for high-density polypropylene, particulrly where the increased impact strength is of significance. For example, the improved impact strength is significant and becomes apparent in the production of molded machine parts which are subjected to mechanical wear, such as rollers, bearings, gears and a multitude of other mechanical shapes and forms, the use of the present polymeric material in the fabrication of such parts providing such structures having greatly enhanced resistance to wear, breakage and mechanical distortion than solid polymers of presently produced high-density polypropylene.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A polypropylene composition comprising high-density polypropylene and about 2 to about 50 percent, by weight, of a polymeric modifier selected from the group consisting of cellulose ester of carboxylic acid and cellulose ether, said polymeric modifier being capable of increasing the impact strength of the polypropylene.

2. A polypropylene composition comprising high-density polypropylene and about 2 to about 50%, by weight, of a polymeric modifier comprising a cellulose ester of a carboxylic acid, said polymeric modifier being capable of increasing the impact strength of the polypropylene.

3. A polypropylene composition comprising high-density polypropylene and about 2 to about 50%, by weight, of a polymeric modifier comprising a cellulose ether, said polymeric modifier being capable of increasing the impact strength of the polypropylene.

4. A polypropylene composition exhibiting increased impact strength which comprises high-density polypropylene and about 5 to about 30%, by weight, of cellulose acetate.

5. A polypropylene composition exhibiting increased impact strength which comprises high-density polypropylene and about 5 to about 30%, by weight, of cellulose butyrate.

6. A polypropylene composition exhibiting increased impact strength which comprises high-density polypropylene and about 5 to about 30%, by weight, of methyl cellulose.

7. A polypropylene composition exhibiting increased impact strength which comprises high-density polypropylene and about 5 to about 30%, by weight, of ethyl cellulose.

No references cited.

WILLIAM H. SHORT, *Primary Examiner.*

J. NORRIS, *Assistant Examiner.*